(12) United States Patent
Wang et al.

(10) Patent No.: US 12,269,132 B2
(45) Date of Patent: Apr. 8, 2025

(54) PROCESSING METHOD AND DEVICE FOR HEAT EXCHANGER

(71) Applicant: SANHUA (HANGZHOU) MICRO CHANNEL HEAT EXCHANGER CO., LTD., Zhejiang (CN)

(72) Inventors: Feng Wang, Zhejiang (CN); Ying Gao, Zhejiang (CN); Qiang Gao, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 0 days.

(21) Appl. No.: 18/288,699

(22) PCT Filed: Apr. 21, 2022

(86) PCT No.: PCT/CN2022/088310
§ 371 (c)(1),
(2) Date: Oct. 27, 2023

(87) PCT Pub. No.: WO2022/228283
PCT Pub. Date: Nov. 3, 2022

(65) Prior Publication Data
US 2024/0207985 A1 Jun. 27, 2024

(30) Foreign Application Priority Data
Apr. 27, 2021 (CN) .......................... 202110460604.4

(51) Int. Cl.
*B23P 19/04* (2006.01)
*B23P 15/26* (2006.01)
*F28F 1/04* (2006.01)

(52) U.S. Cl.
CPC ................ *B23P 15/26* (2013.01); *F28F 1/04* (2013.01)

(58) Field of Classification Search
CPC ........... B23P 15/26; B23P 19/00; B23P 19/02; B23P 21/00; B23P 19/001; F28F 1/04
See application file for complete search history.

(56) References Cited

U.S. PATENT DOCUMENTS 4,611,375 A * 9/1986 Zapawa ................. B23P 15/26
29/726
2009/0145587 A1 6/2009 Young et al.

FOREIGN PATENT DOCUMENTS

CN 1777787 A * 5/2006 ............. B23K 3/087
CN 202200027 U 4/2012
(Continued)

OTHER PUBLICATIONS

English translation of CN-102744604-A (Year: 2012).*
English translation of CN-1777787-A (Year: 2006).*

*Primary Examiner* — Jun S Yoo
(74) *Attorney, Agent, or Firm* — Bridgeway IP Law Group, PLLC; Jihun Kim

(57) ABSTRACT

A processing method for a heat exchanger includes: operation S100, preparing a heat exchange module, wherein the heat exchange module includes a plurality of flat tubes; operation S200, placing at least part of the heat exchange module on a first platform; operation S300, limiting the heat exchange module in a width direction of the first platform; operation S400, limiting the heat exchange module in a length direction of the first platform; operation S500, preparing a fin module; operation S600 or operation S700, using a pushing piece to push the heat exchange module to move the plurality of flat tubes by a preset distance along the width or length direction of the first platform; and operation S800, repeating operations S500 and S600, or repeating operations S500 and S700, until installation of N fin modules and one heat exchange module is completed, wherein N is greater than or equal to 2.

13 Claims, 13 Drawing Sheets

(56) References Cited

FOREIGN PATENT DOCUMENTS

| CN | 102744604 | A | * | 10/2012 |
| CN | 104043960 | A | | 9/2014 |
| CN | 213020416 | U | | 4/2021 |

* cited by examiner

PROCESSING METHOD AND DEVICE FOR HEAT EXCHANGER

CROSS-REFERENCE TO RELATED APPLICATIONS

The present application is a National Stage of International Application No. PCT/CN2022/088310, filed on Apr. 21, 2022, which claims the benefit of priority to Chinese Application No. 202110460604.4, filed on Apr. 27, 2021, both of which are incorporated by reference herein in their entireties for all purposes.

FIELD

The present disclosure relates to a field of heat exchange, and in particular to a processing method and a processing device for a heat exchanger.

BACKGROUND

Microchannel heat exchangers are widely used in air conditioners. Heat pump fin air conditioners usually adopt cross-inserted fin microchannel heat exchanger, a fin of the cross-inserted fin microchannel heat exchanger has slots, and microchannel flat tubes are inserted into the slots of the fin. The assembling manner of the cross-inserted fin microchannel heat exchanger is different from that of the traditional microchannel heat exchanger. In the manufacturing of the heat exchanger in the related art, the gathered fins are assembled to the flat tubes of the heat exchanger at one time. For large-size heat exchangers, the number of the fins assembled at one time is too large, and the fins tend to be deformed, thus further affecting the assembling effect.

SUMMARY

A processing method for a heat exchanger according to a first aspect of embodiments of the present disclosure includes: operation S100, preparing a heat exchange module, wherein the heat exchange module includes a plurality of flat tubes; operation S200, placing at least part of the heat exchange module on a first platform, wherein the plurality of flat tubes are arranged at intervals along a thickness direction of the plurality of flat tubes; operation S300, limiting the heat exchange module in a width direction of the first platform; operation S400, limiting the heat exchange module in a length direction of the first platform; operation S500, preparing a fin module, wherein the fin module includes a plurality of fins arranged at intervals along a length direction of the plurality of flat tubes, each of the plurality of fins includes a plurality of holes arranged at intervals along a thickness direction of the plurality of flat tubes, each of the plurality of holes penetrates the fin along a thickness direction of the fin; and moving the fin module so that the flat tube is inserted into the hole of the fin, wherein the plurality of flat tubes have a one-to-one correspondence with the plurality of holes, and each of the plurality of flat tubes is inserted into a corresponding hole; operation S600, using a pushing piece to push the heat exchange module to move the plurality of flat tubes by a preset distance along the width direction of the first platform, wherein the preset distance is greater than or equal to a maximum size of the fin module along the width direction of the first platform; or operation S700, using a pushing piece to push the heat exchange module to move the plurality of flat tubes by a preset distance along the length direction of the first platform, wherein the preset distance is greater than or equal to a maximum size of the fin module along the length direction of the first platform; and operation S800, repeating operations S500 and S600, or repeating operations S500 and S700, until installation of N fin modules and one heat exchange module is completed, wherein N is greater than or equal to 2.

A processing device for a heat exchanger according to a second aspect of embodiments of the present disclosure includes: a first component including: a first platform configured to carry a heat exchange module; a pushing piece arranged on a side of the first platform in a width direction of the first platform and movable in the width direction or a length direction of the first platform; a first positioning piece, wherein a length of the first positioning piece is greater than or equal to a length of the first platform, and a length direction of the first positioning piece is parallel to the length direction of the first platform, so as to limit the heat exchange module in the width direction of the first platform, wherein the first positioning piece is located between the pushing piece and the first platform in the width direction of the first platform; and a second positioning piece movable along a thickness direction of the first platform or having a changeable size in a thickness direction of the first platform, so as to limit the heat exchange module in the length direction of the first platform; and a second component including: a first rod, wherein a length direction of the first rod is parallel to the width direction of the first platform, and a length of the first rod is greater than a width of the first platform; and a press-fitting piece, wherein the first rod is located between the press-fitting piece and the first platform in the thickness direction of the first platform.

DETAILED DESCRIPTION

Hereinafter, embodiments of the present disclosure will be described in detail, examples of the embodiments are illustrated in the accompanying drawings. The embodiments described below by referring to the accompanying drawings are illustrative and are intended to explain the present disclosure, and should not be construed as limiting the present disclosure.

A processing method for a heat exchanger according to embodiments of the present disclosure will be described below with reference to the accompanying drawings.

As shown in FIGS. 1-11, the processing method for the heat exchanger according to the embodiments of the present disclosure includes the following operations.

At operation S100, a heat exchange module 200 is prepared, and the heat exchange module 200 includes a plurality of microchannel flat tubes.

Figure 1:
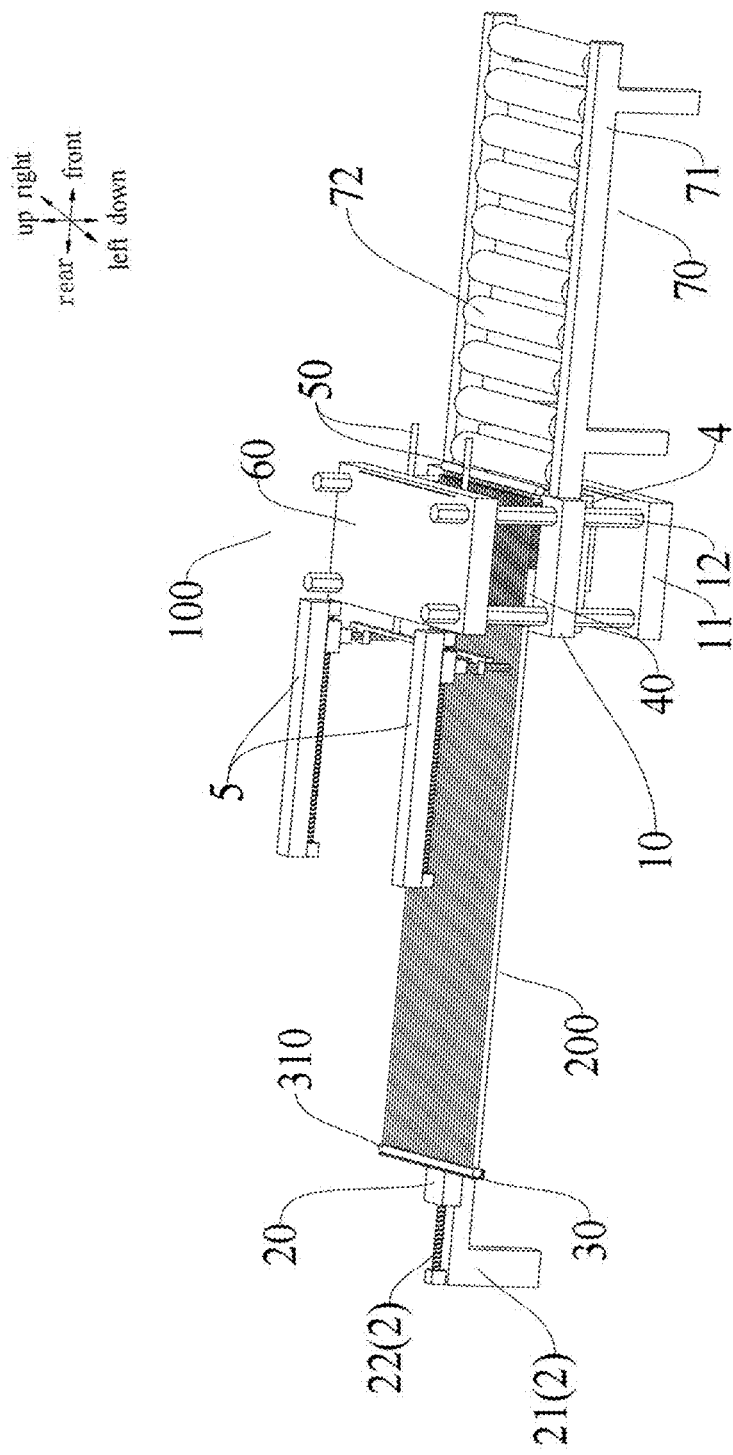
FIG. 1 is a schematic view of a processing device for a heat exchanger according to an embodiment of the present disclosure.
Figure 2:
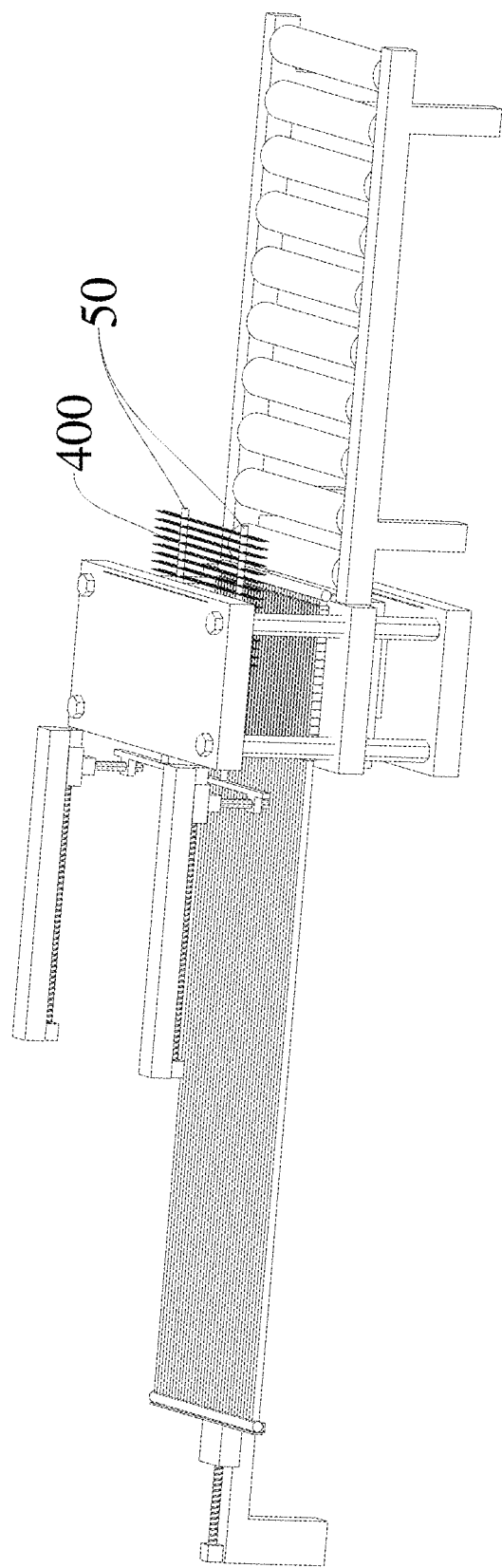
FIG. 2 is a schematic view of a processing device for a heat exchanger according to an embodiment of the present disclosure.

At operation S200, at least part of the heat exchange module 200 is placed on a first platform 10, and the plurality of flat tubes are arranged at intervals along their thickness direction (a left-right direction as shown in FIG. 1). Specifically, there is a gap between adjacent flat tubes. In addition, a first header 310 of the heat exchanger may be arranged at one end (a rear end) of the heat exchange module 200 in a length direction (a front-rear direction as shown in FIG. 1) of the flat tube, and a second header 320 of the heat exchanger may be arranged at the other end (a front end) of the heat exchange module 200 in the length direction of the flat tube.

At operation S300, the heat exchange module 200 is limited in a width direction (the front-rear direction as shown in FIG. 1) of the first platform 10. As shown in FIG. 1, part of the heat exchange module 200 is placed on the first platform 10, and the rear end of the heat exchange module 200 is limited by a first positioning piece 30.

At operation S400, the heat exchange module 200 is limited in a length direction of the first platform 10. As shown in FIG. 1, a second positioning piece 40 extends upwards or has an increasing size in an up-down direction, and the second positioning piece 40 is inserted into the gap between adjacent flat tubes of the heat exchange module 200, thereby limiting the heat exchange module 200. Specifically, there are a plurality of second positioning pieces 40, which are arranged at intervals in the left-right direction, there is a gap between adjacent second positioning pieces 40, and one flat tube is placed between two adjacent second positioning pieces 40. In other words, the plurality of second positioning pieces 40 and the plurality of flat tubes are alternated, that is, there is one flat tube between two adjacent second positioning pieces 40, and the second positioning pieces 40 can move up and down.

At operation S500, a fin module 400 is prepared. The fin module 400 includes a plurality of fins arranged at intervals along the length direction of the flat tube, the fin includes a plurality of holes arranged at intervals along the thickness direction of the flat tube, and the hole penetrates the fin along a thickness direction of the fin. The plurality of flat tubes have a one-to-one correspondence with the plurality of holes. The fin module 400 is moved so that the flat tube is inserted into the hole of the fin, and each flat tube is inserted into a corresponding hole. As shown in FIGS. 2-5, during the movement of the fin module 400 along a width direction of the flat tube (the up-down direction as shown in FIG. 1), the fin module 400 is placed on a first rod 50, and the first rod 50 passes through the holes of the plurality of fins. After the flat tube is in contact with the second positioning piece 40, the second positioning piece 40 is moved along a thickness direction of the first platform 10 (the up-down direction as shown in FIG. 1), or the size of the second positioning piece 40 along the thickness direction of the first platform 10 changes, so that the fin module 400 can continue to move along the width direction of the flat tube.

At operation S600, a pushing piece 20 is used to push the heat exchange module 200 to move the flat tube by a preset distance along a width direction of the first platform 10. The preset distance is greater than or equal to the maximum size of the fin module 400 along the width direction of the first platform 10.

At operation S700, a pushing piece 20 is used to push the heat exchange module 200 to move the flat tube by a preset distance along the length direction of the first platform 10. The preset distance is greater than or equal to the maximum size of the fin module 400 along the length direction of the first platform 10.

For example, the pushing piece 20 is used to push the heat exchange module 200, so that the flat tube is moved by the preset distance in the width direction of the first platform 10 (the front-rear direction as shown in FIG. 1), and the preset distance is greater than or equal to the maximum size of the fin module 400 in the width direction of the first platform 10. For another example, the pushing piece 20 is used to push the heat exchange module 200, so that the flat tube is moved by the preset distance along the length direction of the first platform 10 (the left-right direction as shown in FIG. 1), and the preset distance is greater than or equal to the maximum size of the fin module 400 in the length direction of the first platform 10.

Figure 6:
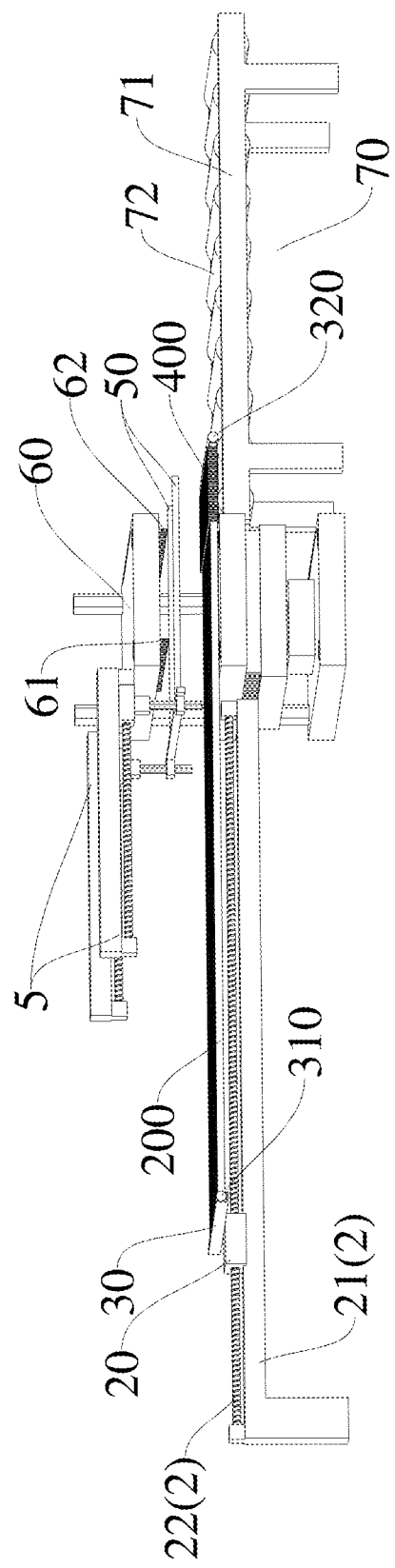
FIG. 6 is a schematic view of a processing device for a heat exchanger according to an embodiment of the present disclosure.
Figure 7:
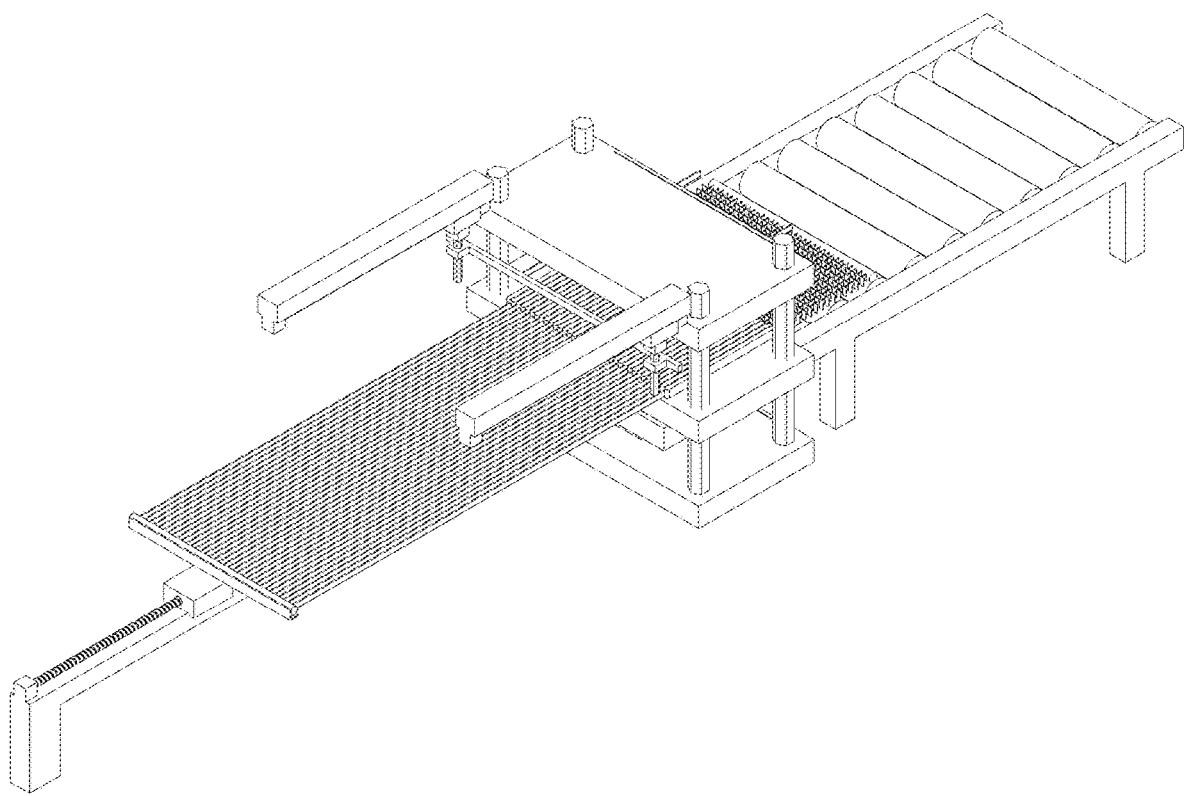
FIG. 7 is a schematic view of a processing device for a heat exchanger according to an embodiment of the present disclosure.

As shown in FIG. 6, under the drive of a first drive assembly 2, the pushing piece 20 is moved rightwards (the left-right direction when facing FIG. 6, which is also the width direction of the first platform, that is, the front-rear direction shown in FIG. 1). Under the push of the pushing piece 20, the flat tube is moved rightwards (that is, forward in FIG. 1) by the preset distance, and a part of the flat tube to which the fins have been assembled is moved to be above a supporting assembly 70.

At operation S800, operations S500 and S600, or operations S500 and S700 are repeated, until the assembling of N fin modules 400 and one heat exchange module 200 is completed. N is greater than or equal to 2.

According to the processing method for the heat exchanger of the embodiments of the present disclosure, after the heat exchange module 200 is limited, one fin module 400 is assembled to a part of the heat exchange module 200, the heat exchange module 200 is pushed by the pushing piece 20, and then another fin module 400 is assembled to another part of the heat exchange module 200, until the assembling of the N fin modules 400 and one heat exchange module 200 is completed.

According to the processing method for the heat exchanger of the embodiments of the present disclosure, the fins required by one heat exchange unit or the heat exchanger are installed with the flat tubes in batches, and the heat exchange module 200 is moved to adjust the position of each fin installation, so that the fin installation is not limited by the length and quantity of the flat tubes, and the fins in a single batch are subject to a small pressure when installed, because the fins are assembled with the flat tubes in batches, thus reducing the deformation of the fins and avoiding the collapse of the fins.

Therefore, the processing method for the heat exchanger in the embodiments of the present disclosure has the advantages of good universality and high assembling efficiency.

It should be noted that the operation numbers of the present disclosure are only for convenience of description, and are not intended to limit the execution order of each operation. In the present disclosure, the above operations can be performed in any order without conflict, and two or more operations can be performed at the same time.

In some embodiments, as shown in FIGS. 2-5, operation S500 includes the following operations.

At operation S501, the fin module 400 is placed on the first rod 50, and the plurality of fins are in contact with the first rod 50. There are a plurality of first rods 50, and when the plurality of fins are in contact with the first rods 50, the first rods 50 sequentially pass through the holes of the plurality of fins. Specifically, a side of the hole of the fin is open in a width direction of the fin (i.e. the hole of the fin is configured as a slot), for example, a lower side of the hole of the fin is open as shown in FIG. 1, so that the flat tube can be inserted into the hole of the fin.

Figure 4:
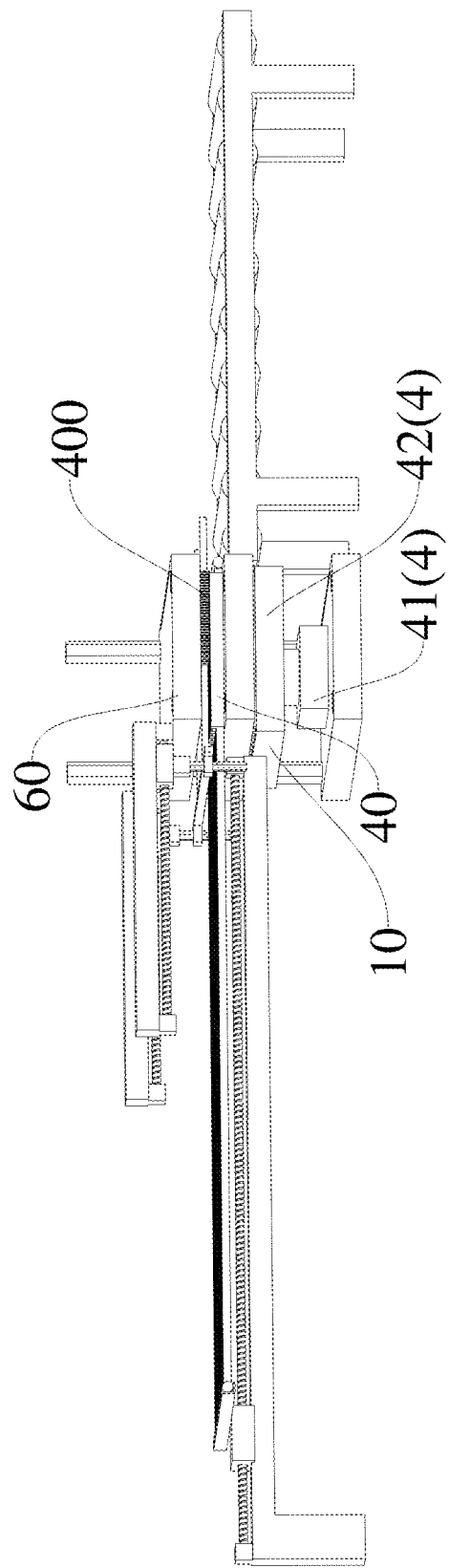
FIG. 4 is a schematic view of a processing device for a heat exchanger according to an embodiment of the present disclosure.

At operation S502, the first rod 50 and the fin module 400 are moved along the width direction of the flat tube. As shown in FIG. 4, the first rod 50 and a press-fitting piece 60 are simultaneously driven by an external force to move downwards, thus driving the fin module 400 to move downwards.

Figure 5:
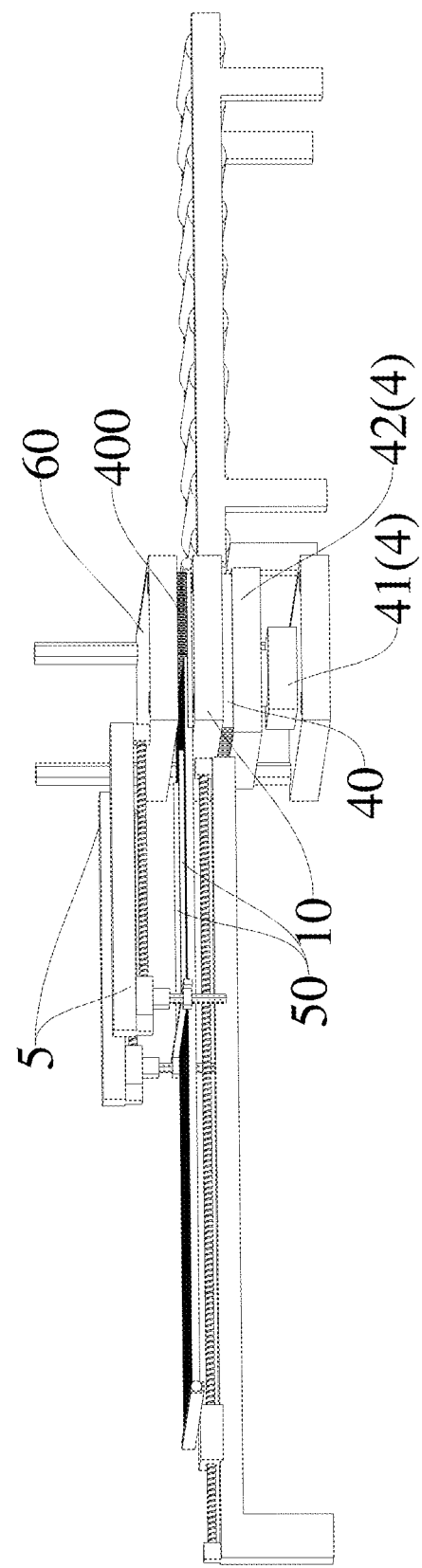
FIG. 5 is a schematic view of a processing device for a heat exchanger according to an embodiment of the present disclosure.

At operation S503, after the plurality of fins of the fin module 400 are in contact with the second positioning piece 40, the first rod 50 is separated from the fin module 400. As shown in FIG. 5, after the plurality of fins of the fin module 400 are in contact with the second positioning piece 40, the first rod 50 is moved leftwards (i.e., rearwards in FIG. 1) under the drive of a third drive assembly 5, until the first rod 50 is separated from the fin module 400.

At operation S504, the fin module 400 continues to be moved along the width direction of the flat tube to insert the flat tube into the hole of the fin, and at the same time, the second positioning piece 40 is moved along the thickness direction of the first platform 10. As shown in FIG. 5, the fin module 400 continues to be moved downwards, and at the same time, the second positioning piece 40 is driven by a second drive assembly 4 to move downwards. During the downward movement of the fin module 400, the flat tube is inserted into the hole of the fin.

Figure 3:
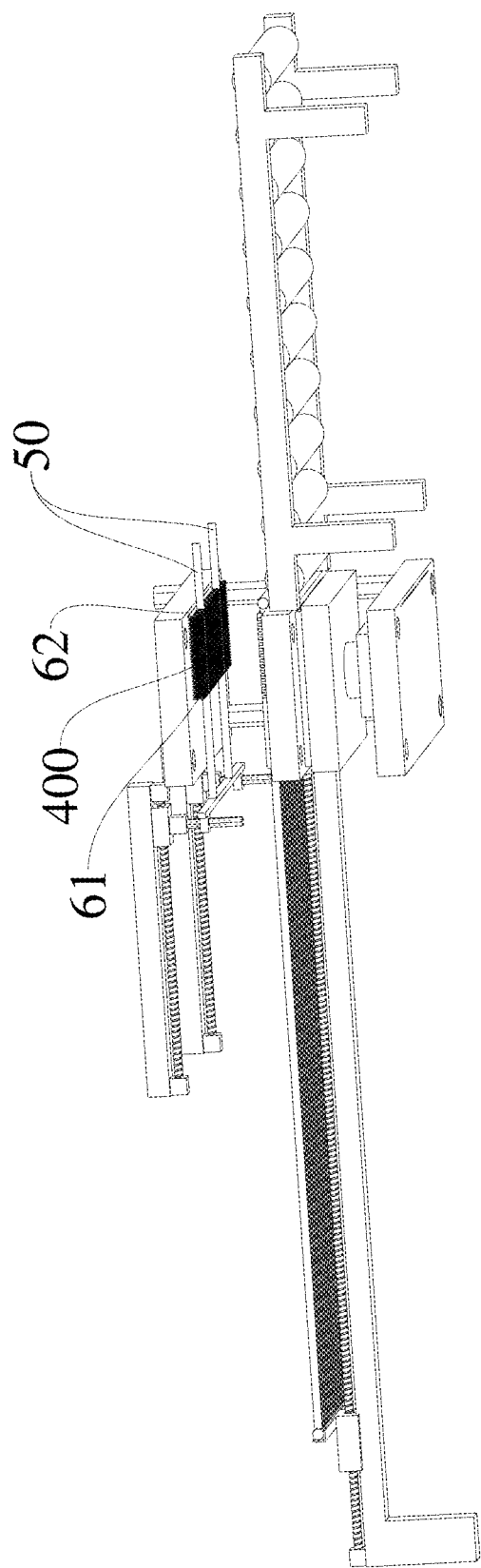
FIG. 3 is a schematic view of a processing device for a heat exchanger according to an embodiment of the present disclosure.
Figure 11:
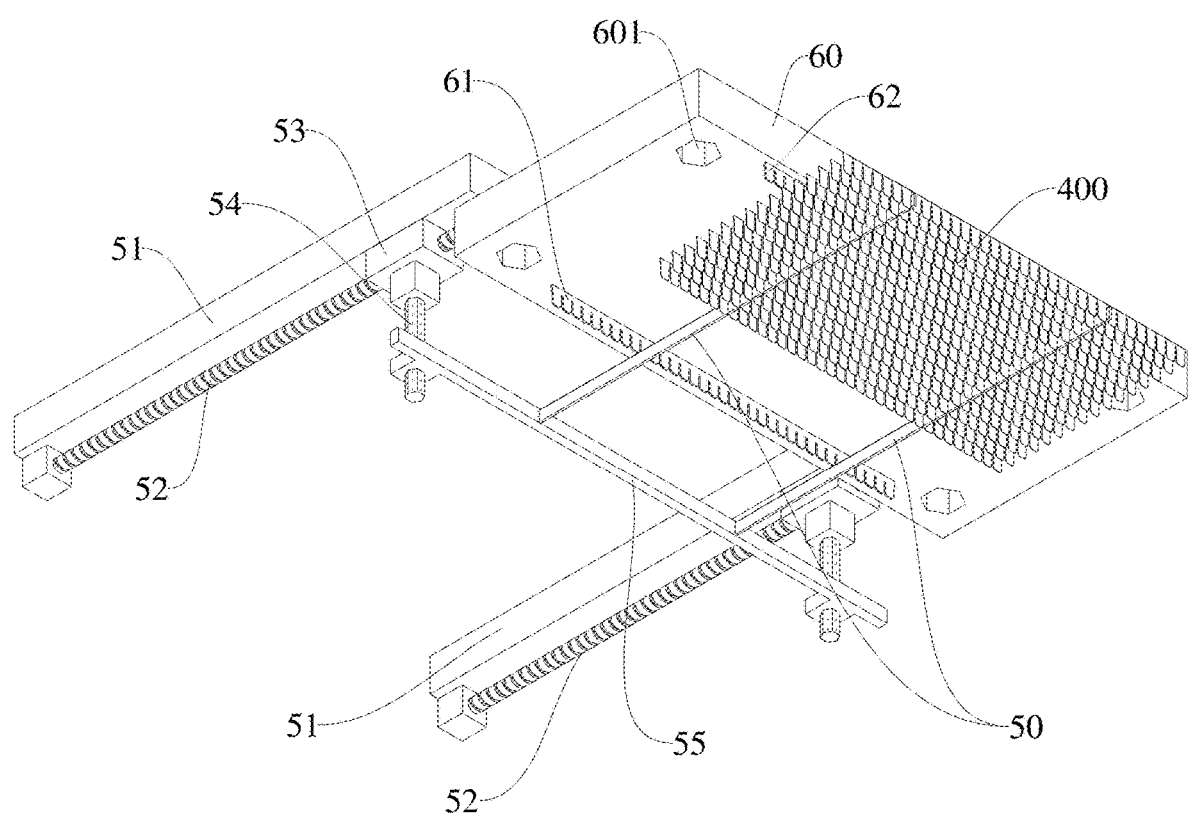
FIG. 11 is a schematic view of a second component.
Figure 12:
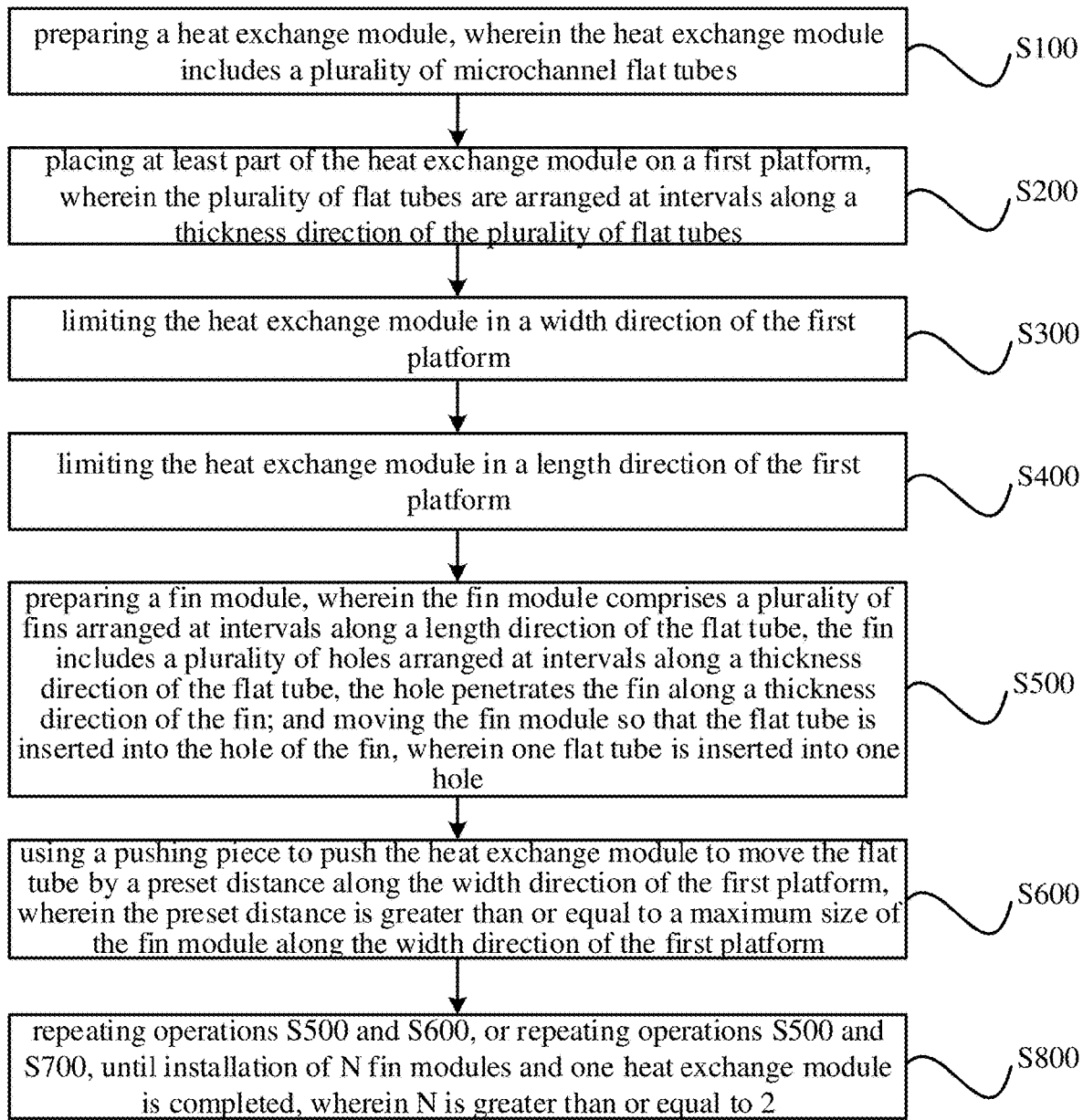
FIG. 12 is a flow chart of a processing method for a heat exchanger according to an embodiment of the present disclosure.
Figure 13:
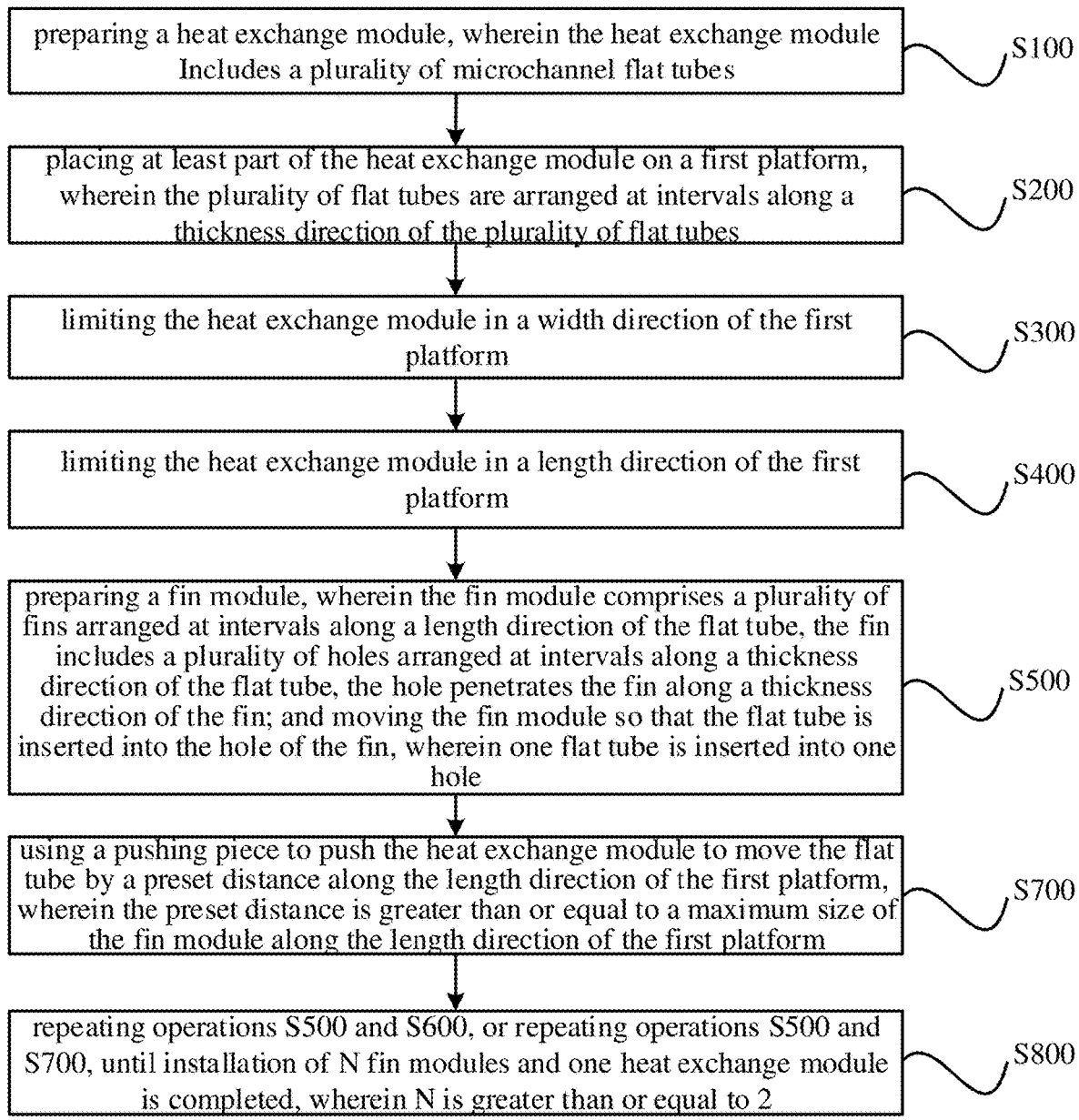
FIG. 13 is a flow chart of a processing method for a heat exchanger according to an embodiment of the present disclosure.

It can be understood that, as shown in FIGS. 3 and 11, at operation S501, or after operation S501 and before operation S502, the fins are adjusted so that the gap distance between adjacent fins meets a predetermined value. Specifically, the fin module 400 is placed between a first plate 61 and a second plate 62, and the first plate 61 is moved rightwards (i.e., frontwards in FIG. 1), so that the fins are gathered to make the gap distance between adjacent fins meet the predetermined value, and the fins can also be adjusted, which is beneficial to the positioning of the fins during installation.

In other embodiments, as shown in FIGS. 2-5, operation S500 includes the following operations.

At operation S501, the fin module 400 is placed on the first rod 50, and the plurality of fins are in contact with the first rod 50. There are a plurality of first rods 50, and when the plurality of fins are in contact with the first rods 50, the first rods 50 sequentially pass through the holes of the plurality of fins. Specifically, a side of the hole of the fin is open in the width direction of the fin, for example, a lower side of the hole of the fin is open as shown in FIG. 1, so that the flat tube can be inserted into the hole of the fin.

At operation S502, the first rod 50 and the fin module 400 are moved along the width direction of the flat tube. As shown in FIG. 4, the first rod 50 and a press-fitting piece 60 are simultaneously driven by an external force to move downwards, thus driving the fin module 400 to move downwards.

At operation S503, after the plurality of fins of the fin module 400 are in contact with the second positioning piece 40, the first rod 50 is separated from the fin module 400. As shown in FIG. 5, after the plurality of fins of the fin module 400 are in contact with the second positioning piece 40, the first rod 50 is moved leftwards (i.e., rearwards in FIG. 1) under the drive of a third drive assembly 5, until the first rod 50 is separated from the fin module 400.

At operation S504, the fin module 400 continues to be moved along the width direction of the flat tube to insert the flat tube into the hole of the fin, and at the same time, the size of the second positioning piece 40 in the thickness direction of the first platform 10 decreases. In the embodiments of the present disclosure, during the downward movement of the fin module 400, the size of the second positioning piece 40 in the thickness direction of the first platform 10 continuously decreases. The second positioning piece 40 may be a retractable extension and retraction piece or other components or structural members whose sizes in the thickness direction of the first platform 10 can be changed.

A processing device 100 for a heat exchanger according to embodiments of the present disclosure will be described below with reference to the accompanying drawings.

As shown in FIGS. 1-11, a processing device 100 for a heat exchanger according to the embodiments of the present disclosure includes a first component, a second component, a supporting base 11 and an upright column 12. The first component includes a first platform 10, a pushing piece 20, a first positioning piece 30 and a second positioning piece 40. The second component includes a first rod 50 and a press-fitting piece 60.

The first platform 10 is configured to carry the heat exchange module 200, and at least part of the heat exchange module 200 is placed on the first platform 10.

The pushing piece 20 is arranged on a side of the first platform 10 in a width direction of the first platform 10 (a rear side of the first platform 10 as shown in FIG. 1), and the pushing piece 20 is movable in the width direction of the first platform 10 (a front-rear direction as shown in FIG. 1). Specifically, the pushing piece 20 is movable along the width direction of the first platform 10 under the drive of a first drive assembly 2.

Figure 10:
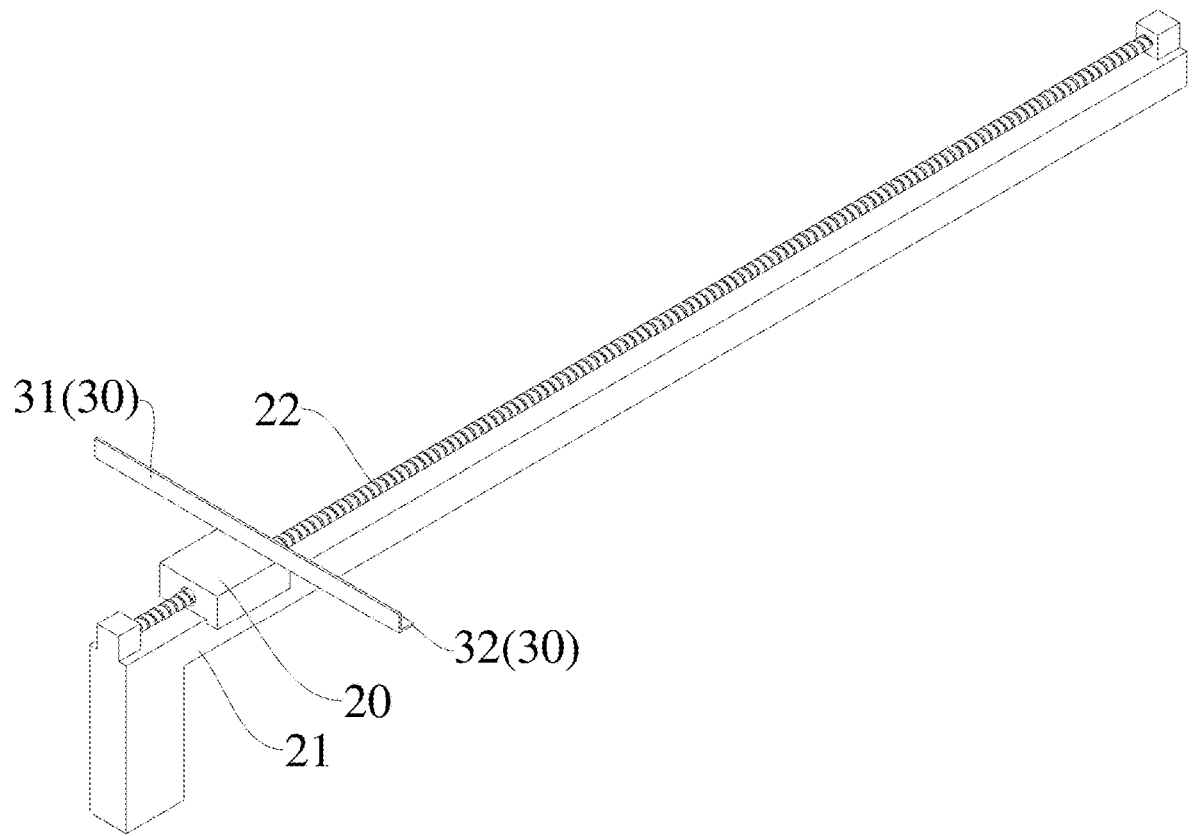
FIG. 10 is a schematic view of a pushing piece and a first positioning piece.

As shown in FIGS. 1 and 10, the first drive assembly 2 includes a first supporting frame 21 and a first pushing rod 22. The processing device 100 for the heat exchanger of the embodiments of the present disclosure further includes a first driver (not shown in the drawings). The first pushing rod 22 is arranged on the first supporting frame 21, is connected with the pushing piece 20, and is also connected with the first driver, so that the first pushing rod 22 may drive the pushing piece 20 to move forward or backward under the drive of the first driver.

Specifically, the first pushing rod 22 is a screw rod, one end of the first pushing rod 22 is rotatably arranged at one end of the first supporting frame 21, the other end of the first pushing rod 22 is rotatably arranged at the other end of the first supporting frame 21, and the first driver is connected with one end or the other end of the first pushing rod 22 to drive the first pushing rod 22 to rotate. The pushing piece 20 is provided with a threaded hole fitted with the first pushing rod 22, and a sliding groove fitted with the first supporting frame 21 is provided at the bottom of the pushing piece 20, so that when the first driver drives the first pushing rod 22 to rotate forward or backward (i.e. clockwise or counterclockwise), the pushing piece 20 can move forward or backward.

It may be understood that the first pushing rod may also be other components or structural members that can drive the pushing piece 20 to move back and forth under the drive of the first driver.

A length of the first positioning piece 30 is greater than or equal to a length of the first platform 10, and a length direction of the first positioning piece 30 is parallel to a length direction of the first platform 10, so that the first positioning piece 30 can limit the heat exchange module 200 in a width direction of the first platform 10. The first positioning piece 30 is located between the pushing piece 20 and the first platform 10 in the width direction of the first platform 10, and is connected with the pushing piece 20, so that the pushing piece 20 can drive the heat exchange module 200 to move through the first positioning piece 30.

As shown in FIGS. 1 and 10, the first positioning piece 30 includes a first positioning plate 31 and a second positioning plate 32, a width direction of the first positioning plate 31 is perpendicular to a width direction of the second positioning plate 32, and a side of the first positioning plate 31 in its width direction is connected with a side of the second positioning plate 32 in its width direction to form an L-shaped positioning piece. The first positioning piece 30 may also have other structural designs, which can limit the heat exchange module 200 in the width direction of the first platform 10.

The second positioning piece 40 is movable along a thickness direction of the first platform 10 (an up-down direction as shown in FIG. 1) or a size of the second positioning piece 40 in the thickness direction of the first platform 10 is changeable, so as to limit the heat exchange module 200 in the length direction of the first platform 10.

Figure 8:
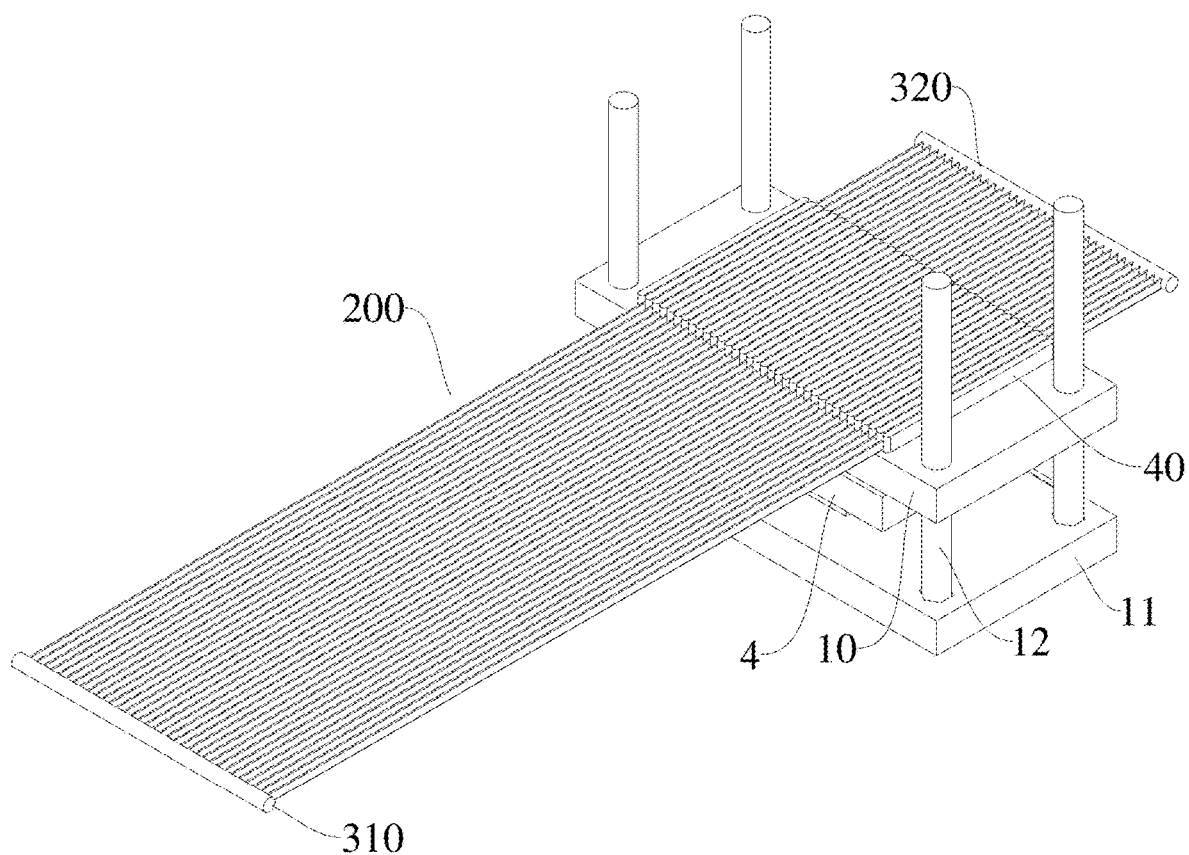
FIG. 8 is a schematic view of a first platform and a second positioning piece.
Figure 9:
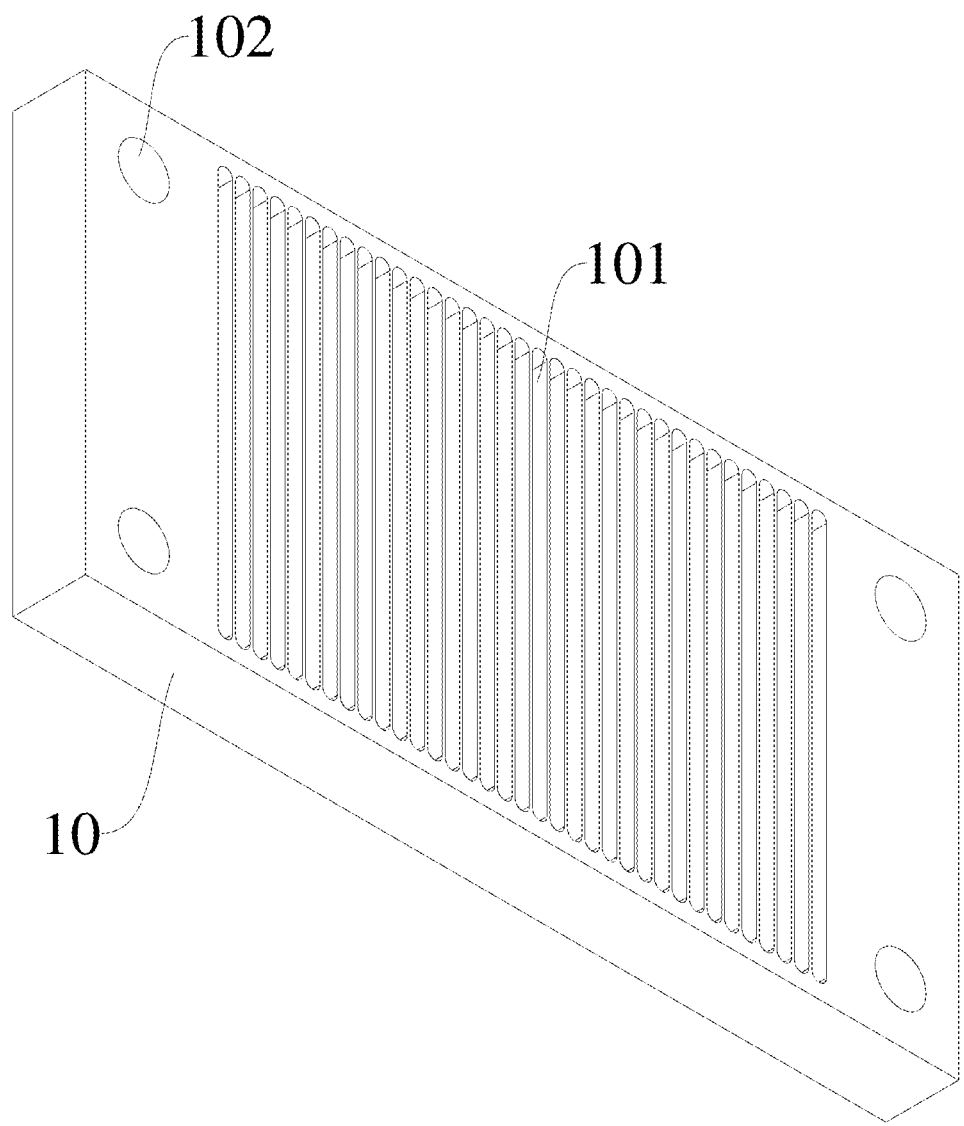
FIG. 9 is a schematic view of a first platform.

As shown in FIG. 1, FIG. 5 and FIG. 8, the second positioning piece 40 can move in the up-down direction under the drive of a second drive assembly 4. Specifically, the second drive assembly 4 includes a second driver 41 and a second platform 42. The second positioning piece 40 is arranged on the second platform 42, and the second platform 42 can move up and down under the drive of the second driver 41, so that the second positioning piece 40 can move in the up-down direction under the drive of the second drive assembly 4.

There are a plurality of second positioning pieces 40, which are arranged at intervals in the left-right direction, there is a gap between adjacent second positioning pieces 40 in the left-right direction, and one flat tube is placed between two adjacent second positioning pieces 40. In other words, the plurality of second positioning pieces 40 and the plurality of flat tubes are alternated, that is, there is one flat tube between two adjacent second positioning pieces 40, and the second positioning pieces 40 can move up and down.

The first platform 10 includes a plurality of positioning holes 101 arranged at intervals in the length direction of the first platform 10, and the plurality of second positioning pieces 40 have a one-to-one correspondence with the plurality of positioning holes 101, so that the second positioning piece 40 can pass through the positioning hole 101 in the thickness direction of the first platform 10.

As shown in FIGS. 1 and 11, a length direction of the first rod 50 (the front-rear direction as shown in FIG. 1) is parallel to the width direction of the first platform 10, and a length of the first rod 50 is greater than a width of the first platform 10. Therefore, the first rod 50 can carry the fin module 400, which is beneficial to the gathering and adjustment of the fins, so that the gap distance between adjacent fins meets a predetermined value.

As shown in FIGS. 1-9, the first rod 50 is located between the press-fitting piece 60 and the first platform 10 in the thickness direction of the first platform 10. There are a plurality of upright columns 12, a length direction of the upright column 12 is parallel to the thickness direction of the first platform 10, and the plurality of upright columns 12 are arranged at the corners of the supporting base 11. The upright column 12 has a circular cross section or a polygonal cross section. The first platform 10 is located between the supporting base 11 and the press-fitting piece 60 in the up-down direction. The first platform 10 is provided with a first connecting hole 102 fitted with the upright column 12, and the press-fitting piece 60 is provided with a second connecting hole 601 fitted with the upright column 12. The first platform 10 is fixedly connected with the upright column 12, and the press-fitting piece 60 can move along the length direction of the upright column 12 under the drive of an external force.

As shown in FIG. 11, there are a plurality of first rods 50, which are connected together by a connecting rod 55, and the first rods 50 can move in the front-rear direction under the drive of a third drive assembly 5.

There may be a plurality of third driving assemblies 5, and each third drive assembly 5 includes a second supporting frame 51, a second pushing rod 52, a moving piece 53 and a guide rod 54. The processing device 100 for the heat exchanger of the embodiments of the present disclosure further includes a third driver (not shown in the drawings). The second pushing rod 52 is arranged on the second supporting frame 51, connected with the moving piece 53, and also connected with the third driver, so that the second pushing rod 52 drives the moving piece 53 to move forward or backward under the drive of the third driver.

Specifically, the second pushing rod 52 is a screw rod, one end of the second pushing rod 52 is rotatably arranged at one end of the second supporting frame 51, the other end of the second pushing rod 52 is rotatably arranged at the other end of the second supporting frame 51, and the third driver (not shown in the drawings) is connected with one end or the other end of the second pushing rod 52 to drive the second pushing rod 52 to rotate. The moving piece 53 is provided with a threaded hole fitted with the second pushing rod 52, and an upper surface of the moving piece 53 is in smooth contact with a lower surface of the second supporting frame 51, so that the moving piece 53 can move forward or backward when the second pushing rod 52 rotates forward or backward (i.e. clockwise or counterclockwise). The guide rod 54 is connected with the moving piece 53, and a length direction of the guide rod 54 is parallel to the up-down direction. The connecting rod 55 is provided with a guide hole fitted with the guide rod 54, so that the connecting rod 55 and the plurality of first rods 50 can move together along the length direction of the guide rod 54 (the up-down direction as shown in FIG. 1) and the front-rear direction under the drive of an external force.

It may be understood that the second pushing rod 52 may also be other components or structural members that can drive the moving piece 53 to move back and forth under the drive of the third driver.

According to the processing device 100 for the heat exchanger of the embodiments of the present disclosure, the first positioning piece 30 and the second positioning piece 40 can limit the heat exchange module 200. After the fin module 400 is press-fitted to a part of the heat exchange module 200 by the press-fitting piece 60, the pushing piece 20 can push the heat exchange module 200, and then other fin modules 400 can be assembled to the heat exchange module 200, until all the fin modules 400 are press-fitted to the whole heat exchange module 200.

The processing device 100 for the heat exchanger of the embodiments of the present disclosure can assemble the fins with the flat tubes in batches, so that the heat exchanger to be processed is not limited by the size, and thus the processing device 100 for the heat exchanger is suitable for heat exchangers with different sizes. Moreover, the press-fitting force is small, thus reducing the deformation of the fins and avoiding the collapse of the fins.

Therefore, the processing device 100 for the heat exchanger of the embodiments of the present disclosure has the advantages of good universality, good reliability and good assembling effects.

In some embodiments, as shown in FIGS. 6 and 11, the second component further includes a first plate 61 and a second plate 62, and the first plate 61 and/or the second plate 62 are movable along the width direction of the first platform 10. The first plate 61 and the second plate 62 are arranged in parallel along the width direction of the first platform 10, and a length direction of the first plate 61 and a length direction of the second plate 62 are both parallel to the length direction of the first platform 10.

That is, the first plate 61 is movable along the width direction of the first platform 10, and the second plate 62 is fixedly connected with the press-fitting piece 60. Alternatively, the first plate 61 is fixedly connected with the press-fitting piece 60, and the second plate 62 is movable along the width direction of the first platform 10. Alternatively, both the first plate 61 and the second plate 62 are movable along the width direction of the first platform 10. In general, the distance between the first plate 61 and the second plate 62 can be changed, so that the fins can be adjusted by the first plate 61 and the second plate 62, which is beneficial to the adjustment of the fins, and thus the gap distance between adjacent fins can meet the predetermined value.

In other embodiments, the first plate 61 can move along the thickness direction of the first platform 10 so as to gather the fins along the length direction of the first rod 50, and the fins can be directly transported from a fin production equipment (not shown in the drawings) along the first rod 50 to the press-fitting piece 60.

As shown in FIG. 11, the first plate 61 includes a first slot. The first slot penetrates the first plate 61 along a thickness direction of the first plate 61, and a plurality of first slots are provided, which are arranged at intervals along the length direction of the first plate 61. The size of the first rod 50 in the thickness direction of the first platform 10 is smaller than the size of the first slot in the thickness direction of the first platform 10, and the size of the first rod 50 in the length direction of the first platform 10 is smaller than the size of the first slot in the length direction of the first platform 10. That is, the first rod 50 can pass through the first slot along its length direction, and there is a gap between a side surface of the first rod 50 and an inner wall surface of the first slot. Specifically, there is a gap between an upper side surface of the first rod 50 and a corresponding inner wall surface of the first slot, a gap between a lower side surface of the first rod 50 and a corresponding inner wall surface of the first slot, a gap between a left side surface of the first rod 50 and a corresponding inner wall surface of the first slot, and a gap between a right side surface of the first rod 50 and a corresponding inner wall surface of the first slot.

As shown in FIG. 11, a lower side of the first slot is open, thus facilitating the fit between the first rod 50 and the first slot. It may be understood that the lower side surface of the first rod 50 is higher than a lower surface of the first plate 61 when the first rod 50 is fitted with the first slot.

As shown in FIG. 11, the second plate 62 includes a second slot, the second slot penetrates the second plate 62 along a thickness direction of the second plate 62, and there are a plurality of second slots, which are arranged at intervals along the length direction of the second plate 62. The size of the first rod 50 in the thickness direction of the first platform 10 is smaller than the size of the second slot in the thickness direction of the first platform 10, and the size of the first rod 50 in the length direction of the first platform 10 is smaller than the size of the second slot in the length direction of the first platform 10. That is, the first rod 50 can pass through the second slot along its length direction, and there is a gap between a side surface of the first rod 50 and an inner wall surface of the second slot. Specifically, there is a gap between an upper side surface of the first rod 50 and a corresponding inner wall surface of the second slot, a gap between a lower side surface of the first rod 50 and a corresponding inner wall surface of the second slot, a gap between a left side surface of the first rod 50 and a corresponding inner wall surface of the second slot, and a gap between a right side surface of the first rod 50 and a corresponding inner wall surface of the second slot.

As shown in FIG. 11, a lower side of the second slot is open, thus facilitating the fit between the first rod 50 and the second slot. It may be understood that when the first rod 50 is fitted with the second slot, the lower side surface of the first rod 50 is higher than a lower surface of the second plate 62.

In some embodiments, as shown in FIGS. 1-7, the processing device 100 for the heat exchanger further includes a supporting assembly 70. The supporting assembly 70 is arranged on the other side of the first platform 10 in the width direction of the first platform 10 (a front side of the first platform 10 as shown in FIG. 1), and the supporting assembly includes a first roller 72. The supporting assembly 70 includes a roller bracket 71. A plurality of first rollers 72 are provided, and the plurality of first rollers 72 are rotatably arranged on the roller bracket 71. Therefore, it is convenient for the heat exchange module 200 assembled with the fin module 400 to move on the supporting assembly 70.

In the description of the present disclosure, it should be understood that the orientation or position relationship indicated by the terms "center", "longitudinal", "transverse", "length", "width", "thickness", "up", "down", "front", "rear", "left", "right", "vertical", "horizontal", "top", "bottom", "inside", "outside", "clockwise", "counterclockwise", "axial", "radial" and "circumferential" and the like, is based on the orientation or position relationship shown in the accompanying drawings, which is only for the convenience of describing the present disclosure and simplifying the description, and does not indicate or imply that the referred device or element must have a specific orientation, and be constructed and operated in a specific orientation, so it cannot be understood as a limitation of the present disclosure.

In addition, the terms "first" and "second" are only used for purpose of description, and cannot be understood as indicating or implying relative importance or implicitly indicating the number of indicated technical features. Therefore, the feature defined as "first" or "second" may explicitly or implicitly include at least one such feature. In the description of the present disclosure, "a plurality of" means at least two, such as two, three, etc., unless otherwise specifically defined.

In the present disclosure, unless otherwise expressly defined, terms such as "install", "interconnect", "connect", "fix" shall be understood broadly, and may be, for example, fixed connections, detachable connections, or integral connections; may also be mechanical or electrical connections or intercommunication; may also be direct connections or indirect connections via intervening media; may also be inner communications or interactions of two elements, unless otherwise specifically defined. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on", "above", or "on top of" a second feature may include an embodiment in which the first feature is right or obliquely "on", "above", or "on top of" the second feature, or just means that the first feature is at a height higher than that of the second feature, while a first feature "below", "under", or "on bottom of" a second feature may include an embodiment in which the first feature is right or obliquely "below", "under", or "on bottom of" the second feature, or just means that the first feature is at a height lower than that of the second feature.

In the description of the present disclosure, terms such as "an embodiment", "some embodiments", "an example", "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are illustrative and shall not be understood as limitation to the present disclosure, and changes, modifications, alternatives and variations can be made in the above embodiments within the scope of the present disclosure by those skilled in the art.

The invention claimed is:

1. A processing device for a heat exchanger, comprising:
a first component comprising:
a first platform configured to carry a heat exchange module;
a pushing piece arranged on a side of the first platform in a width direction of the first platform and movable in the width direction or a length direction of the first platform;
a first positioning piece, wherein a length of the first positioning piece is greater than or equal to a length of the first platform, and a length direction of the first positioning piece is parallel to the length direction of the first platform, so as to limit the heat exchange module in the width direction of the first platform, wherein the first positioning piece is located between the pushing piece and the first platform in the width direction of the first platform; and
a second positioning piece movable along a thickness direction of the first platform or having a changeable size in a thickness direction of the first platform, so as to limit the heat exchange module in the length direction of the first platform; and
a second component comprising:
a first rod, wherein a length direction of the first rod is parallel to the width direction of the first platform, and a length of the first rod is greater than a width of the first platform; and
a press-fitting piece, wherein the first rod is located between the press-fitting piece and the first platform in the thickness direction of the first platform.

2. The processing device for the heat exchanger according to claim 1, wherein a plurality of second positioning pieces are provided, the plurality of second positioning pieces are arranged at intervals in the length direction of the first platform, and a gap is defined between two adjacent second positioning pieces in the length direction of the first platform.

3. The processing device for the heat exchanger according to claim 1, wherein the second component further comprises a first plate and a second plate, at least one of the first plate and the second plate are movable along the width direction of the first platform, the first plate and the second plate are arranged in parallel along the width direction of the first platform, and a length direction of the first plate and a length direction of the second plate are both parallel to the length direction of the first platform.

4. The processing device for the heat exchanger according to claim 3, wherein the first plate comprises a first slot penetrating the first plate along a thickness direction of the first plate, a plurality of first slots are provided, the plurality of first slots are arranged at intervals along the length direction of the first plate, a size of the first rod in the thickness direction of the first platform is smaller than a size of the first slot in the thickness direction of the first platform, and a size of the first rod in the length direction of the first platform is smaller than a size of the first slot in the length direction of the first platform.

5. The processing device for the heat exchanger according to claim 3, wherein the second plate comprises a second slot penetrating the second plate along a thickness direction of the second plate, a plurality of second slots are provided, the plurality of second slots are arranged at intervals along the length direction of the second plate, a size of the first rod in the thickness direction of the first platform is smaller than a size of the second slot in the thickness direction of the first platform, and a size of the first rod in the length direction of the first platform is smaller than a size of the second slot in the length direction of the first platform.

6. The processing device for the heat exchanger according to claim 1, further comprising a supporting assembly, wherein the supporting assembly is arranged on another side of the first platform in the width direction of the first platform.

7. The processing device for the heat exchanger according to claim 6, wherein the supporting assembly comprises a roller bracket and a first roller rotatably arranged to the roller bracket.

8. The processing device for the heat exchanger according to claim 1, wherein the first platform is provided with a plurality of positioning holes, the plurality of positioning holes are arranged at intervals in the length direction of the first platform, a plurality of second positioning pieces are provided, the plurality of second positioning pieces have a one-to-one correspondence with the plurality of positioning holes, and each of the plurality of second positioning pieces is configured to pass through a corresponding positioning hole in the thickness direction of the first platform.

9. The processing device for the heat exchanger according to claim 1, further comprising a first drive assembly configured to push the pushing piece to move along the width direction of the first platform, wherein the first drive assembly comprises a first supporting frame and a first pushing rod, and the first pushing rod is arranged on the first supporting frame and connected with the pushing piece.

10. The processing device for the heat exchanger according to claim 1, further comprising a second drive assembly configured to drive the second positioning piece to move in the thickness direction of the first platform, wherein the second drive assembly comprises a driver and a second platform, the second positioning piece is arranged on the second platform, and the second platform is configured to move in the thickness direction of the first platform under the drive of the driver.

11. The processing device for the heat exchanger according to claim 1, wherein the first positioning piece comprises a first positioning plate and a second positioning plate, a width direction of the first positioning plate is perpendicular to a width direction of the second positioning plate, and a side of the first positioning plate in its width direction is connected with a side of the second positioning plate in its width direction to form an L-shaped positioning piece.

12. The processing device for the heat exchanger according to claim 1, further comprising a supporting base and a plurality of upright columns arranged at corners of the supporting base, wherein a length direction of the plurality of upright columns is parallel to the thickness direction of the first platform, and the first platform is located between the supporting base and the press-fitting piece in the thickness direction of the first platform.

13. The processing device for the heat exchanger according to claim 12, wherein the first platform has a first connecting hole fitted with each of the plurality of upright columns, the press-fitting piece has a second connecting hole fitted with each of the plurality of upright column, the first platform is fixedly connected with the plurality of upright columns, and the press-fitting piece is configured to move along the length direction of the plurality of upright columns.

\* \* \* \* \*